United States Patent [19]

Graf

[11] Patent Number: 5,307,270
[45] Date of Patent: Apr. 26, 1994

[54] CONTROL SYSTEM FOR A MOTOR VEHICLE DRIVE

[75] Inventor: Friedrich Graf, Regensburg, Fed. Rep. of Germany

[73] Assignee: Siemens Aktiengesellschaft, Munich, Fed. Rep. of Germany

[21] Appl. No.: 941,972

[22] Filed: Sep. 8, 1992

Related U.S. Application Data

[63] Continuation of PCT/DE90/00159, Mar. 6, 1990.

[51] Int. Cl.⁵ .................. G06F 15/50; F16D 43/22; B60K 41/04
[52] U.S. Cl. .................. 364/424.1; 74/866; 74/858; 192/0.032
[58] Field of Search .......... 364/424.1, 424.03, 424.02; 74/866, 867, 869, 858; 60/711; 192/3.3, 0.032, 0.096; 340/147

[56] References Cited

U.S. PATENT DOCUMENTS

| | | | |
|---|---|---|---|
| 3,909,782 | 9/1975 | Mazier | 340/146.1 R |
| 3,911,396 | 10/1975 | Kobayashi et al. | 340/147 |
| 4,324,156 | 4/1982 | Iwanaga et al. | 74/869 |
| 4,403,527 | 9/1983 | Mohl et al. | 74/851 |
| 4,433,547 | 2/1984 | Firey | 60/711 |
| 4,724,939 | 2/1988 | Lockhart et al. | 192/3.3 |
| 4,815,340 | 3/1989 | Iwatsuki et al. | 74/858 |
| 4,933,851 | 6/1990 | Ho et al. | 364/424.1 |
| 4,943,920 | 7/1990 | Hiramatsu et al. | 364/424.1 |
| 4,945,481 | 7/1990 | Iwatsuki et al. | 364/424.1 |
| 4,957,194 | 9/1990 | Sawa et al. | 192/0.096 |
| 4,969,099 | 11/1990 | Iwatsuki et al. | 364/424.03 |
| 4,981,053 | 1/1991 | Yamaguchi | 74/866 |
| 4,986,401 | 1/1991 | Petzold et al. | 192/0.032 |
| 5,019,810 | 5/1991 | Ito et al. | 364/424.1 |
| 5,123,302 | 6/1992 | Brown et al. | 74/866 |
| 5,168,449 | 12/1992 | Benford | 364/424.1 |

FOREIGN PATENT DOCUMENTS

| | | |
|---|---|---|
| 0166894 | 1/1986 | European Pat. Off. |
| 0182376 | 5/1986 | European Pat. Off. |
| 0342643 | 11/1989 | European Pat. Off. |
| 3821245 | 1/1989 | Fed. Rep. of Germany |
| 2935916 | 12/1989 | Fed. Rep. of Germany |
| 2151727 | 7/1985 | United Kingdom |

OTHER PUBLICATIONS

"Der Motoreingriff–ein neues Element der elektronischen Getriebesteurung" Bosch Techn Berichte Jul. 1983, vol. 4, pp. 166–174.

Primary Examiner—Thomas G. Black
Assistant Examiner—Jacques H. Louis-Jacques
Attorney, Agent, or Firm—Herbert L. Lerner; Laurence A. Greenberg

[57] ABSTRACT

A control system for a motor vehicle drive includes an engine control configuration for controlling a variable influencing torque of an engine. A transmission control configuration controls shifting operations of an automatic transmission with a torque converter and transmits an intervention signal to the engine control configuration to carry out an intended shifting operation in a jerk-free and low-wear manner. The transmission control configuration has a circuit configuration for determining a fraction by which the engine torque is to be changed for the shifting operation. The fraction is determined as a function of a transmission input torque obtained from a converter amplification determined by the transmission control configuration and the engine torque determined by the engine control configuration, and as a function of the type of shift. The fraction is transmitted to the engine control configuration as control information for altering the engine torque.

5 Claims, 1 Drawing Sheet

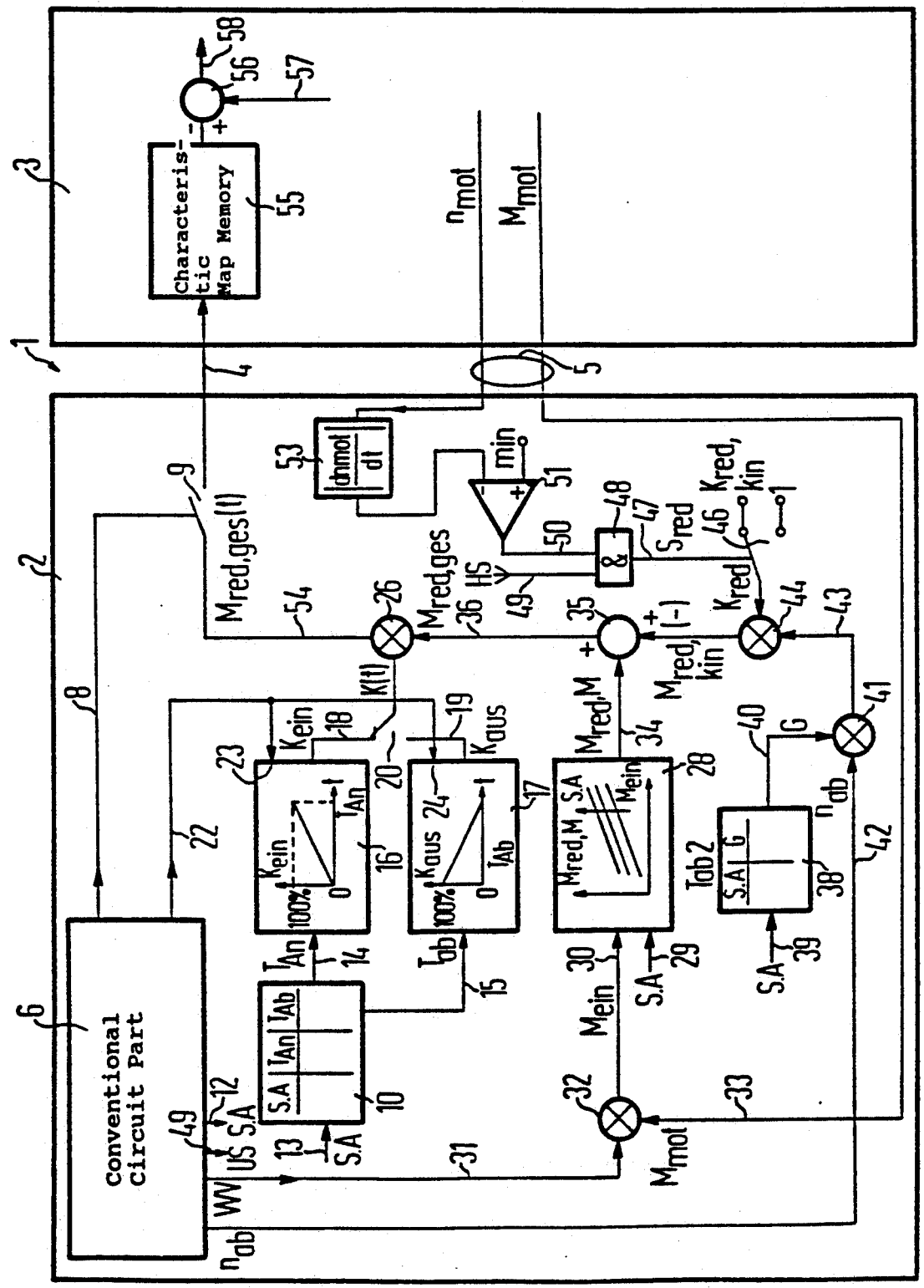

1

CONTROL SYSTEM FOR A MOTOR VEHICLE DRIVE

CROSS-REFERENCE TO RELATED APPLICATION

This application is a Continuation of International Application No. PCT/DE90/00159, filed Mar. 6, 1990.

The invention relates to a control system for a motor vehicle drive having an engine control configuration for controlling a variable influencing the torque of the engine, and a transmission control configuration for controlling shifting operations of an automatic transmission with a torque converter and for transmitting an intervention signal to the engine control configuration in order to carry out an intended or envisaged shifting operation in a shock-free or jerk-free manner. For example, the torque can be altered by the ignition instant, the throttle valve position or the fuel injection quantity.

In a control system for a motor vehicle drive with an automatic transmission, that is known from Published European Application No. 0 342 643 A2, corresponding to U.S. Pat. No. 4,938,100, an engine intervention takes place with a reduction in the engine torque when the transmission is shifted, in order to avoid a shifting jerk. Such an engine intervention only takes place when it is necessary. The intervention signal transmitted from the transmission control system to the engine control system is suppressed in the case of downshifts from fourth to third gear, on one hand, and in the case of upshifts, on the other hand.

In another control system for automatic transmissions known from Published European Application No. 0 182 376 A3, corresponding to U.S. Pat. No. 4,680,988, the transmission ratio in the current gear is measured and altered until it corresponds to the transmission ratio in the new gear. The transmission ratio in that case is controlled in a closed loop, to which the respective vehicle speed and the changing transmission ratio are fed, as input variables to be evaluated.

It is accordingly an object of the invention to provide a control system for a motor vehicle drive, which overcomes the hereinafore-mentioned disadvantages of the heretofore-known devices of this general type, with which shifting operations are carried out in a jerk-free manner and the wear of friction elements of the automatic transmission is reduced and which allows other influencing variables on the shifting operation to be taken into account.

With the foregoing and other objects in view there is provided, in accordance with the invention, a control system for a motor vehicle drive, comprising an engine control configuration for controlling a variable influencing torque of an engine; a transmission control configuration for controlling shifting operations of an automatic transmission with a torque converter and for transmitting an intervention signal to the engine control configuration to carry out an envisaged or intended shifting operation in a jerk-free manner, the transmission control configuration having a first circuit configuration with means for determining a fraction by which the engine torque is to be changed for the shifting operation as a function of a transmission input torque obtained from a converter amplification determined by the transmission control configuration and the engine torque determined by the engine control configuration, and as a function of the type of shift; and means for transmitting the fraction to the engine control configuration as control information so that the engine torque is therefore altered.

In accordance with another feature of the invention, the transmission control configuration includes another or second circuit configuration connected to the circuit configuration with the fraction determining means, the other circuit configuration having means for controlling a time characteristic of a rise and/or a drop of the intervention signal.

In accordance with a further feature of the invention, the transmission control configuration includes another or third circuit configuration connected to the circuit configuration with the fraction determining means, the other circuit configuration having means for determining a part of a reduction of the engine torque to be compensated by a reduction of kinetic energy during a shifting operation.

In accordance with an added feature of the invention, the transmission control configuration includes another or fourth circuit configuration connected to the circuit configuration with the fraction determining means, the other circuit configuration having means for reducing part of a reduction of the engine torque during operation of a motor vehicle drive with high converter slip.

In accordance with a concomitant feature of the invention, the engine control configuration includes a control circuit being connected to the transmitting means and having means for converting the control information received from the transmission control configuration into an alteration in one of an ignition instant, a fuel injection quantity and a throttle valve position.

The advantages of the invention are, in particular, that the engine torque is not only reduced but that this reduction, for its part, is reduced during certain shifting operations, of which further details will be given below, and therefore the engine torque increased. Other features which are considered as characteristic for the invention are set forth in the appended claims.

Although the invention is illustrated and described herein as embodied in a control system for a motor vehicle drive, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

The drawing is a schematic and block circuit diagram of an illustrative embodiment of a control system for a motor vehicle drive according to the invention.

Referring now to the single figure of the drawing in detail, there is seen a control system 1 for a non-illustrated motor vehicle drive which contains a transmission control configuration 2, that is referred to below as transmission control system, and an engine control configuration 3, which is also referred to as an engine control system, that are connected to one another by a bus 4, 5, which forms a rapid data transmission interface. The drawing symbolically shows this bus as having a line 4 through which control information is transmitted from the transmission control system 2 to the engine control system 3, and two lines 5 through which information on the operating condition is transmitted from the engine control system 3 to the transmission control system 2. The bus can also be a line on which the various signals are transmitted in a time-interleaved configuration.

The transmission control system 2 contains a conventional circuit part 6 which carries out the functions of known transmission control systems, and additional circuit parts which are described below. In the circuit part 6, an activation signal is produced and output over a line 8. This signal activates an engine intervention, such as by closing a switch 9.

The manner of operation of the transmission control system 2 can be explained by means of the following equation for a reduced, time-dependent total engine torque $M_{red,ges}(t)$:

$$M_{red,ges}(t) = k(t) \cdot (M_{red,M} + n_{ab} \cdot G \cdot K_{red}) \quad (A)$$

In this equation:

$M_{red,M}$ is the fraction of the reduction of the engine torque or "torque reduction" (as a protective function for the transmission) as a function of the type of shift S.A. and the transmission input torque $M_{ein}$. The type of shift contains information on the new and the old gear of the gear shift that is envisaged and information on whether the motor vehicle is in overrun or tractive mode. The gearbox input torque is obtained from $$M_{ein} = WV \cdot M_{mot},$$

in which the converter amplification WV is determined by the transmission control system 2 and the engine torque $M_{mot}$ is determined by the engine control system 3.

$n_{ab} \cdot G \cdot K_{red} = M_{red,kin}$ is the fraction of the torque reduction which is intended to compensate a torque arising due to reduction of kinetic energy in the shifting operation. In this equation, $n_{ab} \cdot G$ represents the shift-specific fraction due to the gear change. $M_{red,kin}$ can also be negative if, as is expedient, the engine is accelerated during downshifts in overrun mode.

If, on the other hand, an upshift is carried out in the conversion range of the motor vehicle drive, i e. if the absolute value of the time derivative (sometimes also referred to as the gradient) of the engine speed is below a lower threshold value, the fraction $M_{red,kin}$ can be reduced through multiplication by the factor $K_{red}$ since the engine then performs a considerably smaller speed jump and therefore emits less kinetic energy.

$k(t)$ is a time-dependent function which is operative only during switching on, at a time period $T_{an}$, and switching off, at a time period $T_{ab}$, of the torque reduction. When shifting up, for example, Tan is approximately equal to Tab and the function k(t) gives a uniform rise of the torque reduction $M_{red,ges}$ from zero to its maximum value and a corresponding fall to zero.

When shifting down, $T_{an}$ is 0, for example, and $T_{ab}$ is larger than when shifting up, with the result that the torque reduction falls slowly from its maximum value to zero.

The functional combinations described above and the resulting control signals are implemented in the following circuit components.

A first memory 10 contains rise times $T_{an}$ and decay times $T_{ab}$ in relation to various values of the type of shift S.A, in table form. A signal characterizing the type of shift S.A. is output by the circuit part 6 of the transmission control over a signal output line 12 and passes over a signal line 13 to the input of the memory 10. The corresponding output signals $T_{an}$ and $T_{ab}$ pass through respective signal lines 14 and 15 to respective inputs of a first signal generator 16 and a second signal generator 17. As a function of the respective values of $T_{an}$ and $T_{ab}$, these produce the signal k(t), varying with time, which respectively rises from zero to a maximum value $K_{ein}$ and from a maximum value $K_{aus}$ to zero, as their output signal. Elements 10, 16 and 17 form a second circuit configuration having means for controlling a time characteristic of a rise and/or a drop of an intervention or engagement signal.

The signal outputs of the signal generators 16, 17 are connected through lines 18, 19 to two terminals of a changeover switch 20, which is switched over by an "on/off" signal output by the circuit part 6 over a line 22. This signal also passes to activation inputs 23, 24 of the signal generators 16, 17, which are thus activated in order to allow the torque reduction to rise or decay. The respective output signal of the changeover switch 20 is fed to a multiplier 26.

A characteristic memory 28 receives the above-mentioned type of shift S.A. and the transmission input torque $M_{ein}$ as an input signal, over lines 29, 30. The characteristic memory 28 is a first circuit configuration with means for determining a fraction by which the engine torque is to be changed for the shifting operation as a function of a transmission input torque $M_{ein}$ obtained from $M_{ein} = W_{mot}$, the converter amplification WV determined by the transmission control configuration 2 and the engine torque $M_{mot}$ determined by the engine control configuration 3, and as a function of the type of shift S.A.

The converter amplification WV is transmitted over a line 31 from the circuit part 6 to one input of a multiplier 32. The value for the engine torque $M_{mot}$ which is supplied from the engine control system 3, passes to another input of the multiplier over a line 33. As mentioned above, the multiplication of the two values in the multiplier 32 gives the transmission input torque $M_{ein}$.

In the characteristic memory 28, the output signal $M_{red,M}$ is produced as a function of the input signals and is passed through a line 34 to a summing element 35.

A second memory 38 receives the information on the type of shift S.A. over a line 39 and produces an output signal G as a function thereof, which characterizes the transmission of torque caused by a shift, due to a reduction of the kinetic energy of the engine, which is passed to one input of a multiplier 41. The second memory 38 is a third circuit configuration having means for determining a part of a reduction of the engine torque to be compensated by a reduction of kinetic energy during a shifting operation. The transmission output speed $n_{ab}$ supplied by the circuit part 6 passes to another input of the multiplier 41 over a line 42. The output of the multiplier 41 is connected by a line 43 to one input of a multiplier 44. Another input of the multiplier 44 is connected to the output of a switch 46, which is controlled over a line 47 by an output signal of an AND element 48.

A first input of the AND element 48 receives a signal HS emitted by the circuit part 6 over a line 49. The signal HS has the logical value 1 in the case of upshifting. The output of a comparator 51 is connected to a second input of the AND element 48 over a line 50. In the comparator 51, the absolute value of the derivative of the engine speed is compared to a predetermined lower limiting value or threshold value. The absolute value of the derivative of the engine speed $n_{mot}$ is formed by a differentiator 53. If the derivative is below this threshold value, the output signal of the comparator 51 is logical 1. If all of the input signals are logical 1, the output signal of the AND element 48 switches the switch 46 into the upper position shown in the drawing. In this position, a value $K_{red,kin}$ which is smaller than one is applied to the other input of the multiplier 44. In the second switch position, when at least one of the input signals of the AND element 48 is not logical 1, the value one is applied to the multiplier 44. Elements 44, 48, 51 and 53 form a fourth circuit configuration having means for reducing part of a reduction of the engine torque during operation of a motor vehicle drive with high converter slip.

A comparison of the equation (A) given above with the circuit configuration described above reveals that a signal which corresponds to the right-hand term in the bracket of Equation (A) is present at the output of the multiplier 44. In the summing element 35, a signal which corresponds to the left-hand term is added to this signal. The sum of both signal components passes through line 36 to the multiplier 26, in which it is multiplied by a signal component which corresponds to the time-dependent function k(t) of Equation (A).

The signal at the output of the multiplier 26 thus represents the total torque reduction determined in the transmission control system 2, for example in the form of a percentage of the total current engine torque. This value passes through a line 54, the switch 9 and the bus 4 to the engine control system 3, more precisely in the form of an intervention signal which prescribes a particular value for the reduction of the engine torque.

In the engine control system 3, the intervention signal is converted, for example in a characteristic map memory 55, into a correction signal for the ignition, the injection pump or the throttle valve position. Therefore, the characteristic map memory 55 forms a control circuit being connected to the transmitting means and having means for converting the control information received from the transmission control configuration 2 into an alteration in one of an ignition instant, a fuel injection quantity and a throttle valve position. In an adder 56, the correction signal is added to the corresponding control signal for the ignition instant, the fuel injection quantity or the throttle valve position, with the sign of the correction signal being included in the operation. The uncorrected control signal passes through a line 57 to the adder 56 and the corrected control signal is fed through a line 58 to the respective adjusting element, e.g. for the ignition instant. The engine torque is thus altered in a corresponding fashion for the shifting operation. In general, it will be reduced but, in the cases mentioned above, it can also be increased.

The control system described above for a motor vehicle drive thus permits accurate allowance for the various physical parameters affecting the shifting operation and thus permits gentle, shock or jerk-free shifting of the automatic transmission. The frictional stress of the automatic transmission in the friction elements, such as clutches and brakes, is reduced in an effective manner.

I claim:

1. A control system for a motor vehicle drive, comprising:
    an engine control configuration for controlling a variable influencing torque of an engine;
    a transmission control configuration for controlling shifting operations of an automatic transmission with a torque converter and for transmitting an intervention signal to said engine control configuration to carry out an intended shifting operation in a jerk-free manner, said transmission control configuration having a circuit configuration with means for determining a fraction by which the engine torque is to be changed for the shifting operation
        as a function of a transmission input torque obtained from a converter amplification determined by said transmission control configuration and the engine torque determined by said engine control configuration, and
        as a function of the type of shift, said type of shift being defined from information on a new and old gear of an envisaged shift and on whether or not the motor vehicle is in overrun or tractive mode; and
    means for transmitting said fraction to said engine control configuration as control information for altering said engine torque.

2. The control system according to claim 1, wherein said transmission control configuration includes another circuit configuration connected to said circuit configuration with said fraction determining means, said other circuit configuration having means for controlling a time characteristic of at least one of a rise and a drop of said intervention signal.

3. The control system according to claim 1, wherein said transmission control configuration includes another circuit configuration connected to said circuit configuration with said fraction determining means, said other circuit configuration having means for determining a part of a reduction of said engine torque to be compensated by a reduction of kinetic energy during a shifting operation.

4. The control system according to claim 1, wherein said transmission control configuration includes another circuit configuration connected to said circuit configuration with said fraction determining means, said other circuit configuration having means for reducing part of a reduction of the engine torque during operation of a motor vehicle drive with high converter slip.

5. The control system according to claim 1, wherein said engine control configuration includes a control circuit being connected to said transmitting means and having means for converting said control information received from said transmission control configuration into an alteration in one of an ignition instant, a fuel injection quantity and a throttle valve position.

* * * * *